(12) United States Patent
Kawamura

(10) Patent No.: US 10,950,876 B2
(45) Date of Patent: Mar. 16, 2021

(54) REACTOR UNIT

(71) Applicant: DENSO CORPORATION, Kariya (JP)

(72) Inventor: Shuji Kawamura, Toyota (JP)

(73) Assignee: DENSO CORPORATION, Kariya (JP)

( * ) Notice: Subject to any disclaimer, the term of this patent is extended or adjusted under 35 U.S.C. 154(b) by 239 days.

(21) Appl. No.: 16/185,388

(22) Filed: Nov. 9, 2018

(65) Prior Publication Data
US 2019/0190039 A1   Jun. 20, 2019

(30) Foreign Application Priority Data

Dec. 18, 2017   (JP) .............................. JP2017-242115

(51) Int. Cl.
| | |
|---|---|
| H01F 27/08 | (2006.01) |
| H01M 8/04029 | (2016.01) |
| H01M 8/04007 | (2016.01) |
| H01F 27/10 | (2006.01) |
| H01F 37/00 | (2006.01) |
| B60L 58/33 | (2019.01) |
| H02M 1/32 | (2007.01) |
| H02M 3/158 | (2006.01) |

(52) U.S. Cl.
CPC ........ *H01M 8/04029* (2013.01); *H01F 27/10* (2013.01); *H01F 37/00* (2013.01); *H01M 8/04067* (2013.01); *B60L 58/33* (2019.02); *H02M 3/1584* (2013.01); *H02M 2001/327* (2013.01)

(58) Field of Classification Search
CPC .......... H01M 8/04029; H01M 8/04067; B60L 11/1892; B60L 58/33; H01F 37/00; H02M 2001/327; H02M 3/1584
See application file for complete search history.

(56) References Cited

U.S. PATENT DOCUMENTS

| | | | | |
|---|---|---|---|---|
| 6,087,916 A | * | 7/2000 | Kutkut | H01F 27/22 336/195 |
| 7,369,024 B2 | * | 5/2008 | Yargole | H01F 27/085 336/5 |
| 2005/0270745 A1 | * | 12/2005 | Chen | H01F 27/2804 361/707 |
| 2013/0206371 A1 | * | 8/2013 | Fujita | F28F 3/048 165/104.28 |

(Continued)

FOREIGN PATENT DOCUMENTS

| | | |
|---|---|---|
| CN | 1998128 A | 7/2007 |
| CN | 101015026 A | 8/2007 |

(Continued)

*Primary Examiner* — Mang Tin Bik Lian
(74) *Attorney, Agent, or Firm* — Oliff PLC

(57) ABSTRACT

A reactor unit includes a plurality of reactors and a cooler. An inside of the cooler serves as a flow passage of refrigerant, and the reactors are mounted on an outside surface of a bottom plate of the cooler. The bottom plate separates the flow passage from an outside. A plurality of fins is provided on a surface of the bottom plate on the flow passage side. A flat portion in which the fins are not erected is provided in a first region and a second region. The first region is a region of the surface of the bottom plate on the flow passage side and corresponds to a space between a pair of coils of the reactor. The second region corresponds to each of four corners of each of the reactors in a plan view of the bottom plate.

2 Claims, 5 Drawing Sheets

(56) References Cited

U.S. PATENT DOCUMENTS

| | | | |
|---|---|---|---|
| 2014/0266527 A1* | 9/2014 | Vafakhah | H01F 3/14 |
| | | | 336/65 |
| 2016/0035480 A1* | 2/2016 | Hachiya | H01F 27/22 |
| | | | 336/200 |
| 2016/0307685 A1* | 10/2016 | White | H01F 27/325 |
| 2017/0251575 A1 | 8/2017 | Nakamura et al. | |
| 2018/0166207 A1* | 6/2018 | Ikeda | H01F 27/22 |
| 2020/0194159 A1* | 6/2020 | Tsuchida | H01F 27/02 |

FOREIGN PATENT DOCUMENTS

| | | |
|---|---|---|
| CN | 104052246 A | 9/2014 |
| JP | 2017-153269 A | 8/2017 |
| WO | 2005/122377 A1 | 12/2005 |
| WO | 2006/015377 A1 | 2/2006 |

* cited by examiner

REACTOR UNIT

INCORPORATION BY REFERENCE

The disclosure of Japanese Patent Application No. 2017-242115 filed on Dec. 18, 2017 including the specification, drawings and abstract is incorporated herein by reference in its entirety.

BACKGROUND

1. Technical Field

The disclosure relates to a reactor unit in which a plurality of reactors is mounted on a cooler.

2. Description of Related Art

In Japanese Unexamined Patent Application Publication No. 2017-153269 (JP 2017-153269 A), a reactor unit is disclosed. In the reactor unit, a plurality of reactors is mounted on a cooler. Each of the reactors is a passive element in which a coil is wound around a core. The reactor unit described in JP 2017-153269 A is used for a boost converter that boosts output voltage of a fuel cell in a fuel cell vehicle. In the boost converter, four booster circuits are connected in parallel to each other, thus suppressing a load to each one of the booster circuits. Each one of the booster circuits has one reactor. The boost converter described in JP 2017-153269 A includes four of the reactors that structure the reactor unit together with the cooler.

The cooler has a box shape and an inside thereof is a flow passage for refrigerant. The four reactors are mounted on an outside surface of one side plate of the cooler, the side plate separating the flow passage from an outside. The four reactors are arrayed in line in a flow direction of the refrigerant. A plurality of fins is provided on an inside surface (a surface on the flow passage side) of the side plate on which the reactors are mounted. A range corresponding to a space between the neighboring reactors is a flat portion where no fins are provided. Without the flat portion, a flow of the refrigerant between the fins becomes uniform from an upstream through a downstream, and a temperature boundary layer can be formed near the side plate on the downstream side. As the temperature boundary layer develops, temperature of the side plate gets harder to decrease. Since the flat portion disturbs the refrigerant flow, it is possible to restrain the temperature boundary layer.

SUMMARY

With a focus on a shape of a reactor, a reactor unit disclosed in this specification provides a technique that restrains a temperature boundary layer even more than the reactor unit described in JP 2017-153269 A.

A first aspect disclosed in this specification relates to a reactor unit that includes a plurality of reactors and a cooler. An inside of the cooler serves as a flow passage for refrigerant, and the reactors are mounted on an outside surface of one side plate of the cooler. The side plate separates the flow passage from an outside. Also, a plurality of fins is provided on a surface of the side plate on the flow passage side in which the reactors are mounted on the side plate. Each of the reactors includes a ring-shaped core having a pair of straight portions that are parallel to each other, and a quadrangular cylinder-shaped coil wound around each of the straight portions. The reactors are disposed along a flow direction of the refrigerant. A side surface of the quadrangular cylinder-shaped coil and a portion of the core that is exposed from the coil are in contact with the side plate of the cooler. The fins in the cooler are provided at positions facing the portions of each of the reactors, the portions being in contact with the side plate. A flat portion where the fins are not erected is provided in a first region and a second region. The first region is a region of the surface of the side plate on the flow passage side and corresponds to a space between the coils. The second region corresponds to each of four corners of each of the reactors in a plan view of the side plate. In the reactor unit, the flat portion is provided not only between the neighboring reactors but also in the region corresponding to the space between the coils of each of the reactors. The cooler of the reactor unit has more flat portions compared to the cooler of the reactor unit described in JP 2017-153269 A. Thus, the reactor unit disclosed in this specification increases a region where the flow is disturbed, and thus restrains a temperature boundary layer.

In the first aspect, the flat portion where the fins are not erected may be provided in a third region that is a region of the surface of the side plate on the flow passage side and corresponds to a space between the reactors.

Details and further improvements of the technique disclosed in this specification are described in "Detailed Description of Embodiments" below.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
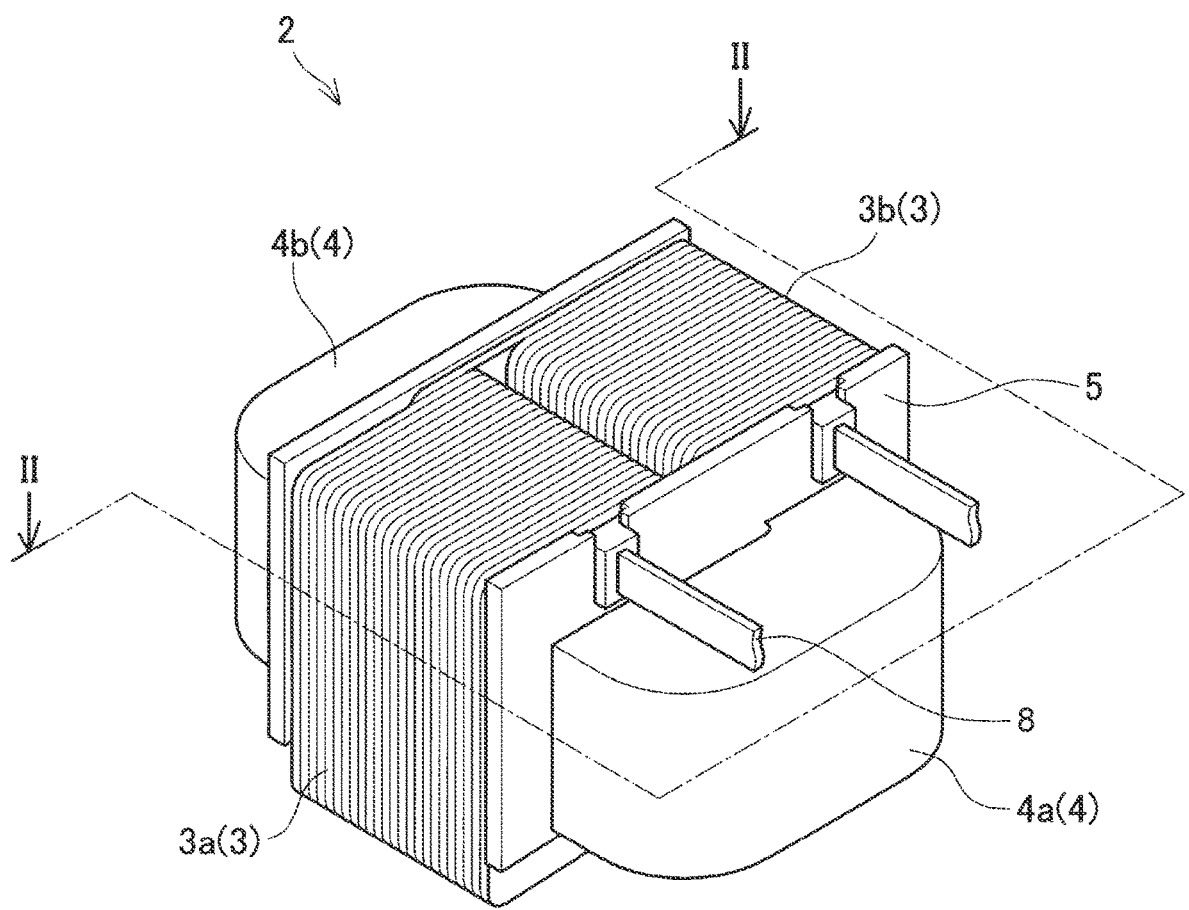
FIG. 1 is a perspective view of a reactor.
Figure 2:
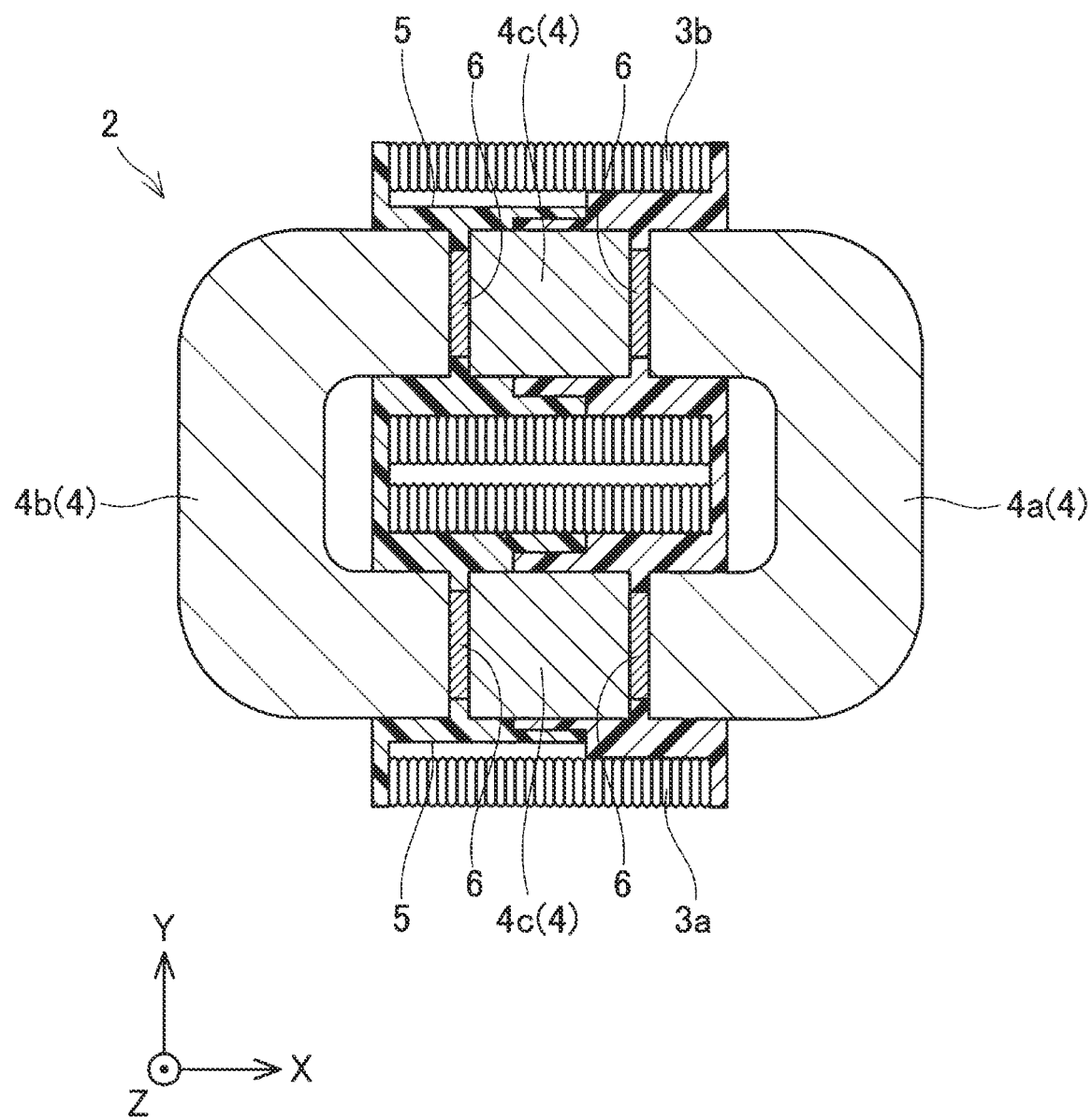
FIG. 2 is a sectional view of the reactor taken along the line II-II in FIG. 1.

A reactor unit according to an example is described with reference to the drawings. First of all, a reactor 2 is described. FIG. 1 shows a perspective view of the reactor 2, and FIG. 2 shows a sectional view taken along the line II-II in FIG. 1. The reactor 2 is a passive element in which two coils 3a, 3b are wound around a ring-shaped core 4. When the two coils 3a, 3b are not distinguished, they are stated as coils 3.

The core 4 includes two U-shaped cores 4a, 4b, two I-shaped cores 4c, and four spacers 6. The two U-shaped cores 4a, 4b are disposed so that distal ends of their U-shaped arms face each other, and the I-shaped cores 4c are disposed so that the I-shaped cores 4c are sandwiched between the distal ends, respectively. Each of the spacers 6 is sandwiched between the distal end of each of the U-shaped cores 4a, 4b, and the I-shaped core 4c. The U-shaped cores 4a, 4b and the I-shaped cores 4c are joined to one another through the spacers 6, and the core 4 has a ring shape as a whole. In the ring-shaped core 4, the portions of the I-shaped cores 4c form a pair of parallel portions. The parallel portions (the I-shaped cores 4c) are covered by a bobbin 5 having two cylindrical portions, and the coils 3a, 3b are wound around the cylindrical portions of the bobbin 5, respectively. The two coils 3a, 3b are made of a single rectangular wire 8, and equivalent to a single coil, electrically. It is ensured that a space is made between the coils 3a, 3b. Each of the coils 3 has a quadrangular cylinder shape, and a section of the core 4 has a rectangular shape.

Figure 3:
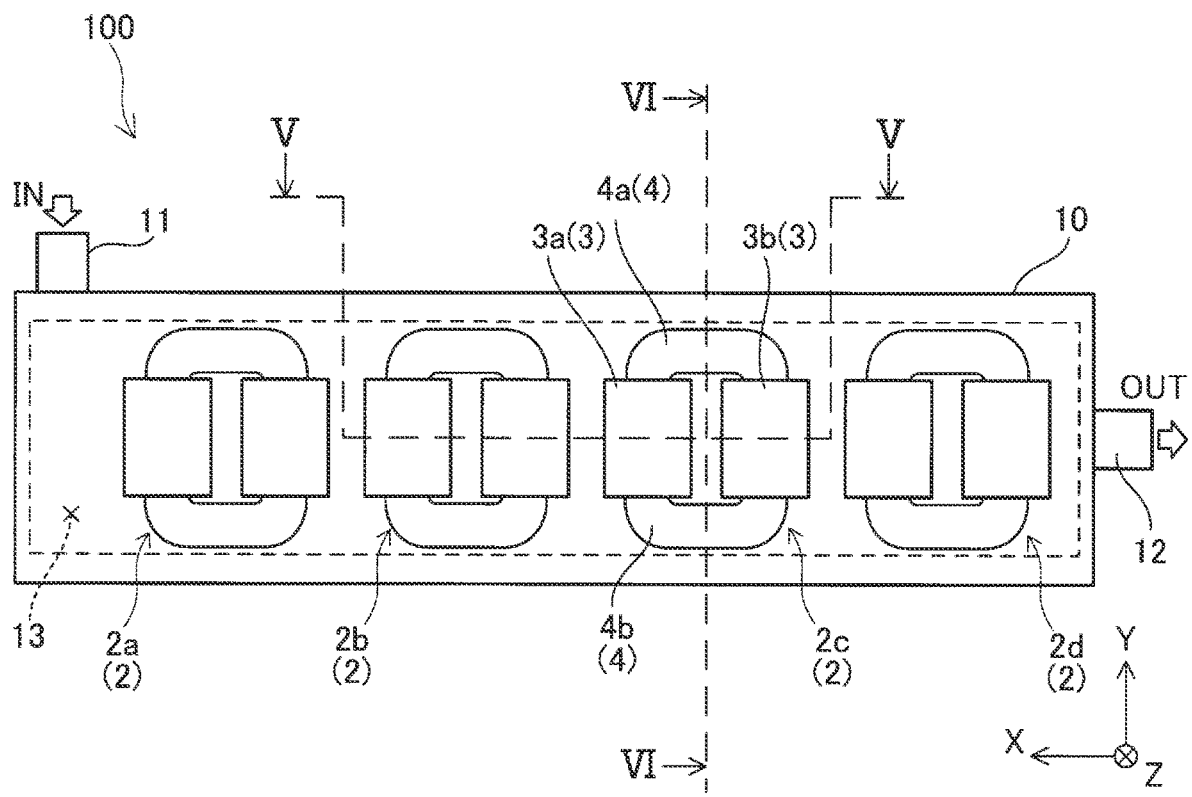
FIG. 3 is a bottom view of a reactor unit.
Figure 4:
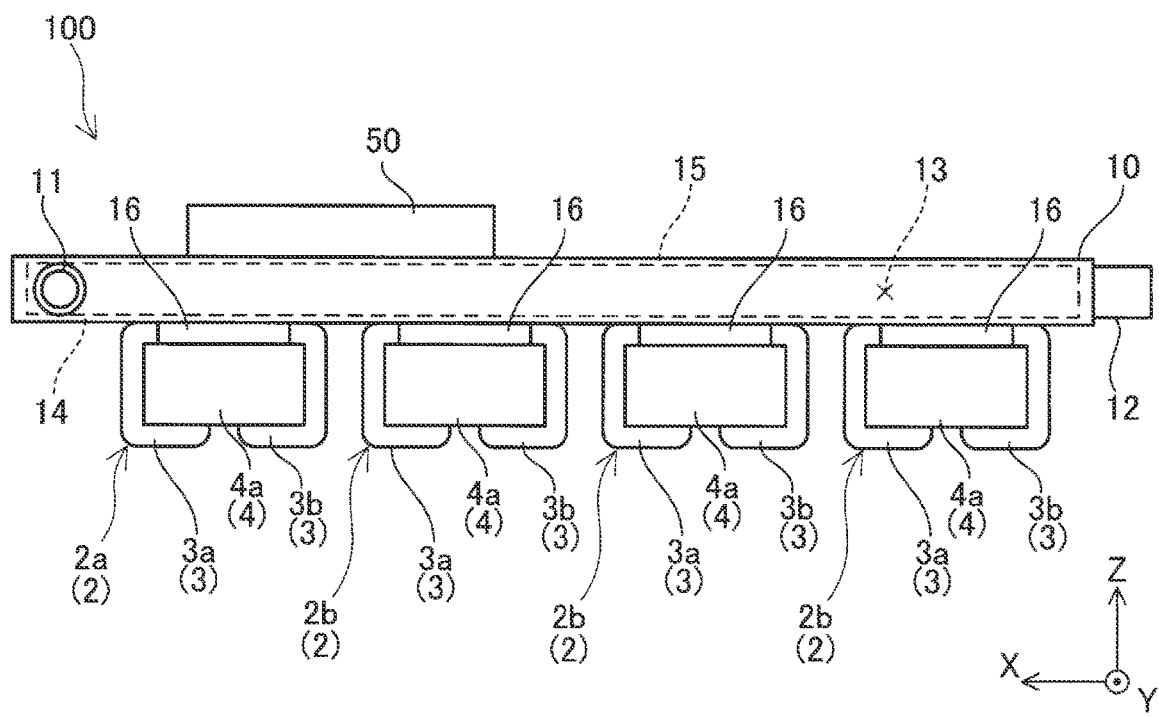
FIG. 4 is a side view of the reactor unit.

FIG. 3 shows a bottom view of a reactor unit 100, and FIG. 4 shows a side view of the reactor unit 100. The reactor unit 100 includes the four reactors 2 (2a, 2b, 2c, 2d), and a cooler 10. The reactor unit 100 is used for a multiphase boost converter. The multiphase boost converter is a device in which four booster circuits are connected in parallel to each other, and each of the booster circuits includes one of the reactors 2. The four reactors 2 of the four booster circuits are aggregated in the reactor unit 100. In FIG. 3 and on, the bobbin 5 of the reactor 2 is not shown.

The four reactors 2 are mounted on one side plate of the cooler 10. The reactor unit 100 is held in a position in which the cooler 10 is located on top of the reactors 2 inside a case of the multiphase boost converter. Therefore, FIG. 3 that shows the reactors 2 overlapping the cooler 10 is a bottom view, and FIG. 4 is a side view in which the reactors 2 are depicted under the cooler 10. Hereinafter, the side plate on which the reactors 2 are mounted is referred to as a bottom plate 14. A side plate facing the bottom plate 14 is referred to as an upper plate 15. An inverter 50 is mounted on an outside surface of the upper plate 15. The inverter 50 is also an object to be cooled by the cooler 10.

The cooler 10 has a hollow box shape, and a flow passage 13 for refrigerant is formed inside the cooler 10. The bottom plate 14 and the upper plate 15 correspond to the side plates that separate the flow passage 13 from an outside. A refrigerant feed port 11 is provided in one end side in the X-axis direction in the drawing, and a refrigerant discharge port 12 is provided on the opposite side. The refrigerant is fed to the flow passage 13 from a circulator (not shown) through the refrigerant feed port 11. As the refrigerant flows in the flow passage 13, the refrigerant absorbs heat form the reactors 2 and the inverter 50, and is returned to the circulator (not shown) through the refrigerant discharge port 12. The refrigerant is water or long life coolant (LLC).

Figure 5:
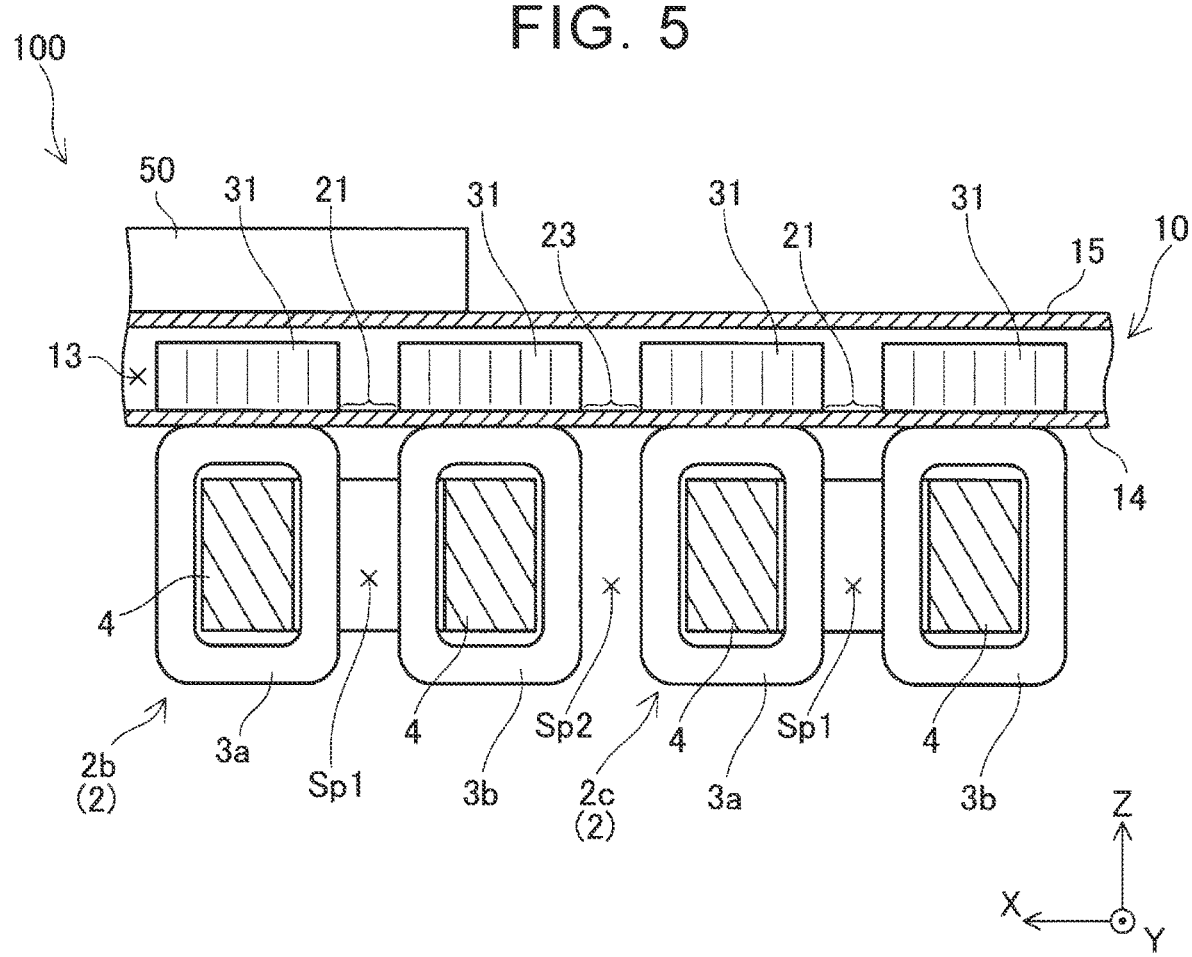
FIG. 5 is a sectional view taken along the line V-V in FIG. 3.
Figure 6:
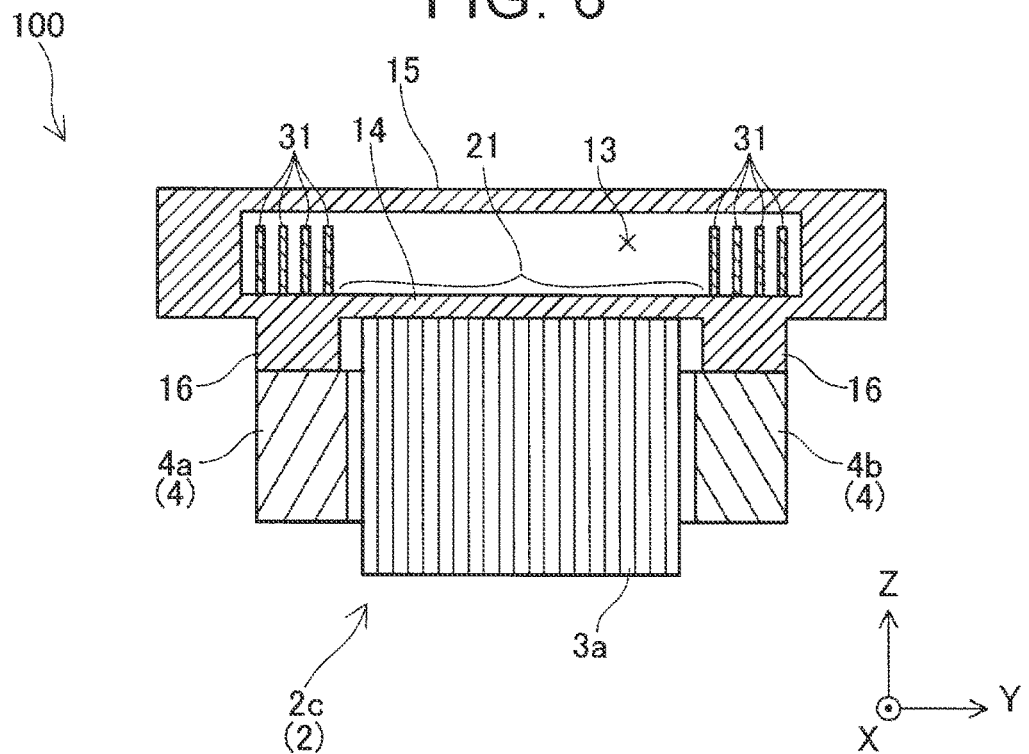
FIG. 6 is a sectional view taken along the line VI-VI in FIG. 3.

The refrigerant flows in the flow passage 13 in the X direction shown in the drawing. The four reactors 2 are disposed in a line along the flow direction of the refrigerant. The four reactors 2 are mounted on an outside surface of the bottom plate 14. On an inside surface of the bottom plate 14 (in other words, a surface on the flow passage 13 side), a plurality of fins is provided. FIG. 5 shows a sectional view taken along the line V-V in FIG. 3, and FIG. 6 shows a sectional view taken along the line VI-VI in FIG. 3. FIG. 5 shows a section of the coils 3 that are cut along a plane orthogonal to an axis of the coils. FIG. 6 shows a section of the reactor 2c taken along a plane that passes between the coils 3a, 3b of the reactor 2c. In FIG. 3, the coils are denoted by the reference numerals 3a, 3b, and the U-shaped cores are denoted by the reference numerals 4a, 4b only in the reactor 2c, and these reference numerals are omitted for the other reactors.

As shown in FIG. 6, a projecting portion 16 is provided in the bottom plate 14 of the cooler 10. The projecting portion 16 projects towards the U-shaped cores 4a, 4b of the core 4. The bottom plate 14 is in contact with the core (the U-shaped cores 4a, 4b) of the reactor 2c through the projecting portion 16. Although the U-shaped cores 4a, 4b partially enter inner sides of the coils 3a, 3b, the U-shaped cores 4a, 4b are hereinafter regarded as portions of the ring-shaped core 4 exposed from the coils 3.

Also, as shown in FIG. 5, each of the coils 3a, 3b has the quadrangular cylinder shape, and one side surface of each of the coils 3a, 3b is in contact with the bottom plate 14 of the cooler 10. The bottom plate 14 is in contact with the one side surface of each of the quadrangular cylinder-shaped coils 3a, 3b, and the U-shaped cores 4a, 4b. The coils 3a, 3b and the U-shaped cores 4a, 4b are portions that generate heat when the coils 3a, 3b are energized. The cooler 10 is able to cool the reactors 2 well because the cooler 10 is in contact with the heat-generating portions of the reactors 2.

Fins 31 are not necessarily provided in the entire inside surface of the bottom plate 14. As shown in FIG. 5 and FIG. 6, in the inside surface of the bottom plate 14, a first flat portion 21 without the fins is provided in a region (a first region) corresponding to a space Sp1 between the coils 3a, 3b. Further, as shown in FIG. 5, a third flat portion 23 without the fins is provided in a region (a third region) corresponding to a space Sp2 between the reactor 2b and the reactor 2c.

Figure 7:
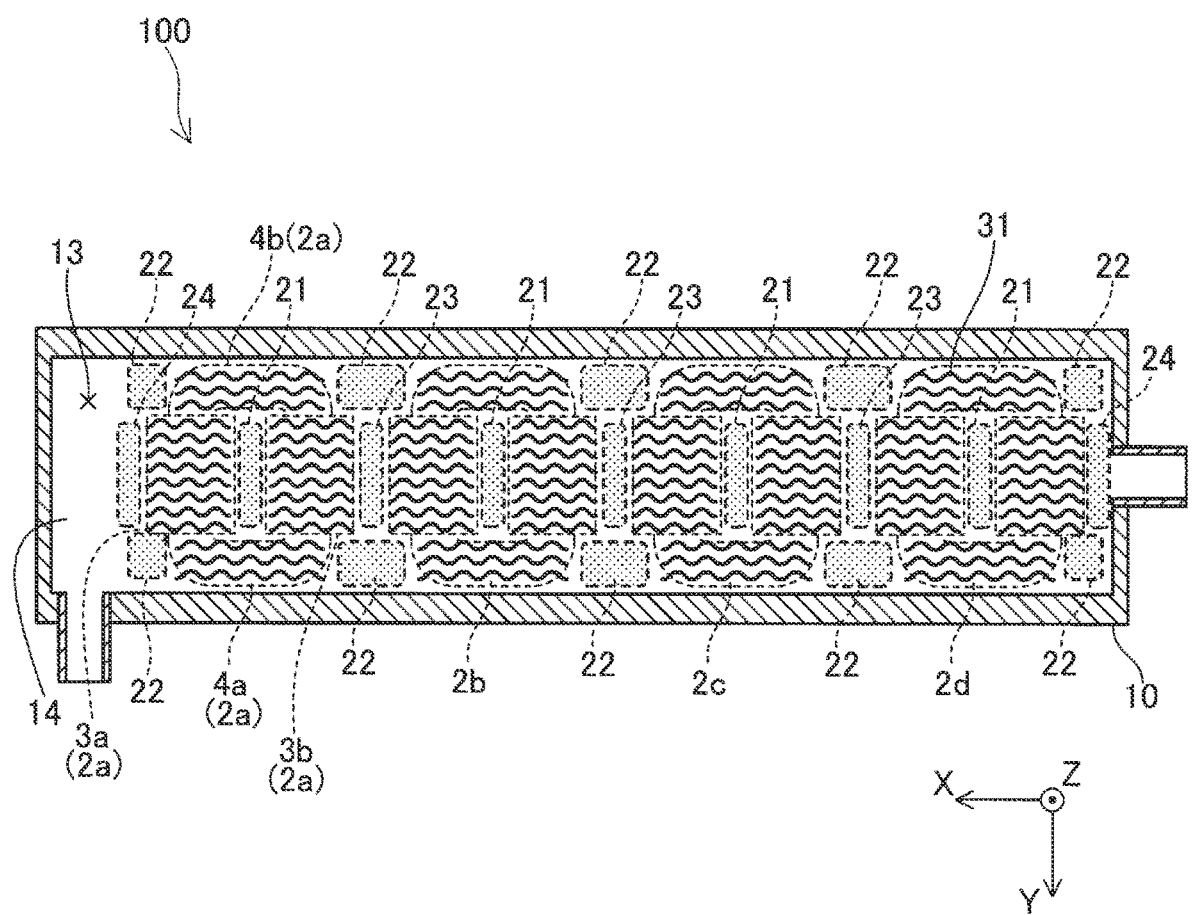
FIG. 7 is a sectional view of the reactor unit cut along a plane parallel to an X-Y plane.

FIG. 7 shows a sectional view of the reactor unit 100 in which the upper plate 15 of the cooler 10 is cut along an X-Y plane in the drawing. FIG. 7 is a top view of the reactor unit 100, and the four reactors are shown in broken lines. In FIG. 7, all thick wavy lines represent the fins 31. As shown in FIG. 7, each of the fins 31 is a wavy fin that bends as if a flat plate waves. In FIG. 7, only one of the wavy fins is denoted by the reference numeral 31, and the reference numeral is omitted for the rest of the wavy fins. Further, in FIG. 7, the coils are denoted by the reference numerals 3a, 3b, and the U-shaped cores are denoted by the reference numerals 4a, 4b only in the reactor 2a on the left, and these reference numerals are omitted for the rest of the reactors.

As shown in FIG. 7, the fins 31 are provided on the inside surface of the bottom plate 14 in regions that are in contact with the coils 3a, 3b. Also, the fins 31 are provided in the inside surface of the bottom plate 14 in regions that are in contact with the U-shaped cores 4a, 4b. Meanwhile, the first flat portions 21 without the fins are provided in the regions (the first regions) of the bottom plate 14 facing the space Sp1 between the coils 3a, 3b. Second flat portions 22 without the fins are also provided in regions (second regions) adjacent to four corners of each of the reactors 2 in a plan view of the bottom plate 14. Further, the third flat portion 23 without the fins is provided in regions (the third region) of the bottom plate 14 corresponding to the space Sp2 between the neighboring reactors 2. Then, fourth flat portions 24 are also provided on the upstream side of the reactor 2a, and on the downstream side of the reactor 2d, respectively. Among the four reactors 2a, 2b, 2c, 2d arrayed in line, the reactor 2a is located on the most upstream side, and the reactor 2d is located on the most downstream side.

As described earlier, the refrigerant flows in the array direction of the four reactors 2. When the flow of the refrigerant is uniform from the upstream through the downstream, a temperature boundary layer can grow near the bottom plate 14 towards the downstream. In temperature boundary layer, the flow is slower and temperature is higher compared to the other places. A thickness of the temperature boundary layer increases towards the downstream. In the reactor unit 100 according to the example, a number of the flat portions (the first flat portions 21, the second flat portions 22, and the third flat portions 23) without the fins are provided in the bottom plate 14. At the flat portions (the first flat portions 21, the second flat portions 22, and the third flat portions 23) without the fins 31, the refrigerant that has passed between the neighboring fins 31 joins the refrigerant that has flowed in the next spaces separated by the fins 31, thereby creating disturbance of the flow. Thus, the flow is disturbed at the flat portions (the first flat portions 21, the second flat portions 22, and the third flat portions 23). As a result, it is possible to restrain growth of the temperature boundary layer. Hereinafter, the first flat portions 21, the second flat portions 22, the third flat portions 23, and the fourth flat portions 24 are sometimes simply referred to as the flat portions 21, 22, 23, 24.

Each of the reactors 2 of the reactor unit 100 includes the coils 3a, 3b that extend in parallel to each other, and there is the space between the coils 3a, 3b. The reactor unit 100 uses the space between the coils. By providing the flat portion (the first flat portion 21) in a region corresponding to the space, deterioration of cooling performance for the reactor 2 is restrained. In the reactor unit 100 according to the example, the fins are provided in the regions facing the coils 3a, 3b and the core 4 (the U-shaped cores 4a, 4b) that are heat-generating portions. Therefore, it is possible to restrain degradation of the cooling performance caused by provision of the flat portions 21, 22, 23, 24.

Further, when the bottom plate 14 with the a number of the fins 31 is manufactured by using an injection molding technique, having a number of the flat portions without the fins is favorable in releasing the bottom plate 14 with the fins 31 from dies.

Notes are given regarding the technique described in the example. The cooler 10 is provided with the bottom plate 14 and the upper plate 15 that face each other. The reactors 2 are mounted on the outside surface of the bottom plate 14, and the fins 31 are provided on the inside surface of the bottom plate 14. The inverter 50 is mounted on the outside surface of the upper plate 15, and the fins 31 are not provided on the inside surface. Heat quantity of the four reactors 2 is far larger than heat quantity of the inverter 50. As a space of the flow passage 13 between the upper plate 15 and the bottom plate 14 is occupied with the fins 31 that cool the reactors 2, it is possible to enhance cooling performance of the bottom plate 14. Therefore, the reactors 2 as high temperature heating sources are cooled powerfully.

A heating source mounted on the upper plate 15 may be a device other than the inverter 50.

Also, it is possible to reduce a height of the cooler 10 by providing no fins in the upper plate 15. This is suitable for a fuel cell vehicle with a small housing space.

In the cooler 10 of the reactor unit 100 according to the example, the wavy fins are used. The wavy fins are suitable in cooling the high temperature heating sources (the reactors 2) because the wavy fins have large contact areas with the refrigerant. However, for the technique disclosed in this specification, different types of fins, such as straight fins, pin fins, and projection fins, may be used.

Resin may be filled in the space between the coils 3a, 3b of each of the reactors 2. Also, resin may be filled in the space between the coil 3 and the core 4. Moreover, resin may cover portions of the reactors 2 that are not in contact with the cooler 10.

Specific examples of the disclosure have been described in detail. However, they are examples only and do not limit the scope of the claims. The technique described in the scope of claims includes various modifications and changes of the specific examples described above. The technical elements described in this specification or the drawings exhibit technical usefulness independently or as various combinations, and are not limited to the combinations described in claims at the time of application. Further, the technique described in this specification and the drawings as examples achieves a plurality of objectives simultaneously, and has technical usefulness by achieving one of those objectives.

What is claimed is:

1. A reactor unit comprising:
   a plurality of reactors, each of the reactors including a ring-shaped core having a pair of straight portions that are parallel to each other, and a quadrangular cylinder-shaped coil wound around each of the straight portions; and
   a cooler, an inside of which serves as a flow passage for refrigerant, the cooler including:
      a plate having an outside surface on which the reactors are mounted, the plate separating the flow passage from an outside, the reactors being disposed along a flow direction of the refrigerant, with a side surface of the quadrangular cylinder-shaped coil and an exposed portion of the core that is exposed from the coil in contact with the plate; and
      a plurality of fins provided on a surface of the plate on a flow passage side, the fins being provided at positions facing the exposed portions of each of the reactors; and
      a flat portion of the plate where the fins are not disposed that is provided in a first region and a second region, the first region being a region of the surface of the plate on the flow passage side and corresponding to a space between the coils, and the second region corresponding to each of four corners of each of the reactors in a plan view of the plate.

2. The reactor unit according to claim 1, wherein the flat portion where the fins are not disposed is provided in a third region that is a region of the surface of the plate on the flow passage side and corresponds to a space between the reactors.

* * * * *